United States Patent
Muller et al.

(10) Patent No.: US 7,693,254 B2
(45) Date of Patent: Apr. 6, 2010

(54) X-RAY DEVICE AND IMAGE-PROCESSING METHOD

(75) Inventors: Serge Louis Wilfrid Muller, Guyancourt (FR); Gero Peters, Paris (FR); Sylvain Bernard, Montigny le Bretonne (FR); Razvan Gabriel Iordache, Paris (FR)

(73) Assignee: General Electric Company, Schenectady, NY (US)

( * ) Notice: Subject to any disclaimer, the term of this patent is extended or adjusted under 35 U.S.C. 154(b) by 141 days.

(21) Appl. No.: 11/673,616

(22) Filed: Feb. 12, 2007

(65) Prior Publication Data

US 2007/0189448 A1 Aug. 16, 2007

(30) Foreign Application Priority Data

Feb. 16, 2006 (FR) .................................. 06 50565

(51) Int. Cl.
*A61B 6/04* (2006.01)

(52) U.S. Cl. ............................................. 378/37; 378/4

(58) Field of Classification Search .................... 378/4, 378/37
See application file for complete search history.

(56) References Cited

U.S. PATENT DOCUMENTS

| | | | | | |
|---|---|---|---|---|---|
| 4,899,318 | A | * | 2/1990 | Schlumberger et al. | 367/8 |
| 4,907,156 | A | * | 3/1990 | Doi et al. | 382/130 |
| 5,276,613 | A | * | 1/1994 | Schlumberger | 378/4 |
| 5,627,907 | A | * | 5/1997 | Gur et al. | 382/132 |
| 5,657,362 | A | * | 8/1997 | Giger et al. | 378/37 |
| 5,799,100 | A | * | 8/1998 | Clarke et al. | 382/132 |
| 5,999,639 | A | * | 12/1999 | Rogers et al. | 382/132 |
| 6,058,322 | A | * | 5/2000 | Nishikawa et al. | 600/408 |
| 6,064,768 | A | | 5/2000 | Chin et al. | |
| 6,081,577 | A | * | 6/2000 | Webber | 378/23 |
| 6,137,898 | A | | 10/2000 | Broussard et al. | |
| 6,205,236 | B1 | | 3/2001 | Rogers et al. | |

(Continued)

FOREIGN PATENT DOCUMENTS

| | | |
|---|---|---|
| EP | 0374045 A1 | 12/1989 |
| EP | 0609922 | 8/1994 |
| EP | 0627695 | 12/1994 |
| EP | 1113392 B1 | 8/2004 |
| FR | 2622991 A1 | 11/1987 |
| FR | 2847698 A1 | 5/2004 |
| FR | 2863749 A1 | 6/2005 |
| WO | WO0079474 A1 | 12/2000 |

OTHER PUBLICATIONS

Peters, Gero, et al., "Reconstruction-Independent 3D CAD for Calcification Detection in Digital Breast Tomosynthesis Using Fuzzy Particles", M. Lazo and A. Sanfeliu (Eds.): CIARP 2005, LNCS 3773, pp. 400-408, 2005.

(Continued)

*Primary Examiner*—Allen C. Ho
*Assistant Examiner*—Alexander H Taningco
(74) *Attorney, Agent, or Firm*—Global Patent Operation; Jonathan E. Thomas (57) ABSTRACT

An x-ray device comprises means for the production of at least one standard projection image of the object in which presumed suspect zones corresponding to radiological signs are represented by markers. The device comprises means for the production of a digital volume of markers in which 3D markers are created in order to represent presumed suspect zones of the object. It also comprises means of re-projection of the 3D markers in the standard projection image in order to confirm the presence of the markers or eliminate or add the markers of the projection image is necessary.

14 Claims, 4 Drawing Sheets

U.S. PATENT DOCUMENTS

| | | | |
|---|---|---|---|
| 6,359,960 B1* | 3/2002 | Wahl et al. | 378/20 |
| 6,551,248 B2 | 4/2003 | Miller | |
| 6,589,180 B2 | 7/2003 | Erikson et al. | |
| 2001/0038681 A1* | 11/2001 | Stanton et al. | 378/55 |
| 2002/0172414 A1 | 11/2002 | Muller et al. | |
| 2003/0194049 A1* | 10/2003 | Claus et al. | 378/22 |
| 2003/0228044 A1* | 12/2003 | Gopalasamy et al. | 382/132 |
| 2004/0202279 A1* | 10/2004 | Besson et al. | 378/37 |
| 2006/0177125 A1* | 8/2006 | Chan et al. | 382/154 |
| 2007/0003117 A1 | 1/2007 | Wheeler et al. | |

OTHER PUBLICATIONS

Unser, et al., "B-Spline Signal Processing: Part II Efficient Design and Applications", IEEE Trans. on Signal Processing, Feb. 1, 1993, p. 834-848.

Unser, et al., "On the Asymtopic Convergence of B-Spline Wavelets to Gabor Functions", IEEE Signal Processing Letters, vol. 38, No. 2, Mar. 1992 pp. 864-872.

Unser, "Fast Gabor-Like Windowed Fourier and Continuous Wavelet Transforms", IEEE Signal Processing Letteres, vol. 1, No. 5, May 1994, pp. 76-79.

Chan, H.P. et al., "Computer-aided Detection on Digital Breast Tomosynthesis(DBT) Mammograms:Comparison of Two Approaches", RSNA, Nov. 30, 2004, Code:SSG17-01, Session: Physics (Breast CAD: Multimaodalities).

Reiser, I. et atl., "Computerized Mass Detection for Digital Breast Tomosynthesis Directly from the Projection Images", RSNA, Nov. 30, 2004 Code: SSG17-02, Session: Physics (Breast CAD: Multimaodalities).

Chan, H.P. etal., "Computerized Detection of Masses on Digital Tomosynthesis Mammograms: A Preliminary Study", IWDM 2004, Jun. 18, 2004, 1:15PM, Clinical and Other Application Abstracts.

Reiser, I. et al., A Reconstruction-Independent Method for Computerized Detection of Mammographic Masses in Tomosynthesis Images, IWDM 2004, Jun. 2004.

* cited by examiner

X-RAY DEVICE AND IMAGE-PROCESSING METHOD

CROSS REFERENCE TO RELATED APPLICATION

This application claims priority to French Application No. 65 50565 filed on Feb. 16, 2006.

FIELD OF THE INVENTION

An object of the present invention is an X-ray device which, in one particular exemplary embodiment, is a mammography device. It can be applied to special advantage but not exclusively in medical imaging and in non-destructive X-ray controls.

It is an aim of the invention to acquire at least one radiography image projection at the same time as a series of projections for tomosynthesis processing.

It is another aim of the invention to improve the ergonomy of use of an X-ray device of this kind to make it both simpler and faster to use.

It is also an aim of the present invention to set up a 3D display of any 2D zone of the projection image having clinical interest.

DESCRIPTION OF THE PRIOR ART

Today, mammography is widely used for the early detection of lesions associated with breast cancer. The radiological signs to be detected in mammography images may be either calcium deposits, called microcalcifications, which constitute elements more opaque to X-rays than the surrounding tissues, or tumors which take the form, in mammography images, of dense regions where the X-rays are absorbed more intensely than in the adjacent regions.

Today, thanks to experience, the radiologist is capable, to a certain extent, of distinguishing between malignant radiological signs and benign radiological signs. The calcium deposits, often grouped in clusters, are analyzed in their totality or individually according to various criteria such as shape, degree of homogeneity or brightness. The radiologist also has criteria available to differentiate between malignant opacities and benign opacities such as shape, density or the degree of sharpness of their contours.

However, it can happen that certain calcium deposits or certain opacities are not spotted. This phenomenon has many causes. In particular, since mammography images are the result of projections, they represent superimposed structures that disturb the visibility of the structures of the breast, sometimes leading to a falsely positive interpretation when a superimposition of these structures resembles opacity or to a falsely negative interpretation when the structures obscure the visibility of a lesion.

To assist in the resolution of these problems of falsely positive or falsely negative interpretation, there are new mammography devices in the prior art that produce a 3D image of the patient's breast. With these new devices, rather than acquire an image by continuous integration of the irradiation on an X-ray sensitive film or a digital detector, it is preferred to carry out an acquisition of a series of images corresponding to a set of exposures made with the X-ray tube of the mammography machine, placed at different positions along a path. The patient's breast and therefore the detector of the mammography machine are irradiated during these consecutives exposures. This new device is used to produce a volume image of the breast through a reconstruction by tomosynthesis of the series of images. These new devices have the advantage of making it easier to search for useful diagnostic information.

However, this new tomosynthesis mammography device has limitations. Indeed, in such tomosynthesis devices, a digital volume reconstruction, typically containing 50 to 80 slices, is made for an average breast. Consequently, the quantity of information to be managed is very great. Similarly, access to a piece of information having clinical interest takes much more time since this information is sought sequentially in the image volume.

Furthermore, this type of device has a methodology of use completely different from the methodology of currently used mammography devices. Consequently, to use these new devices, the practitioner must replace existing methodologies of use by new methodologies of use. These new methodologies with which the practitioners are unfamiliar have not yet been adopted. This is chiefly due to the fact that these new methodologies have not yet been in existence for very long and that the clinical efficiency of these new devices has not yet been fully demonstrated.

For the currently used mammography devices, the frequency of use or the rate of the medical acts is a fundamental piece of information, especially in the context of screening for breast cancer. Indeed, this frequency plays a role in the economics of the apparatus. However, the new tomosynthesis mammography devices cannot have a very high frequency of use since the time of access to the information of clinical interest is very great. Furthermore, this type of device does not guarantee screening success because such success depends essentially on the time spent in locating information of clinical interest.

Another problem, which is more specific to mammography but could occur in other fields, is related to the need to be able to analyze radiological signs, which are clinically interesting between 100 µm and 500 µm. Consequently, the detection and characterizing of anomalies by which a cancer lesion may be suspected in mammography calls for very high spatial resolution. This problem of spatial resolution is critical for tomosynthesis mammography devices. The devices then cannot be used to obtain adequate image quality for very fine analysis of the radiology signs.

SUMMARY OF THE INVENTION

The goal of the invention is precisely to overcome the drawbacks of the techniques explained here above. To this end, the invention proposes techniques for the acquisition of the projection images associated with image-processing methods used to facilitate the detection of radiological signs in the projection image, by means of series of 3D data. With these image-processing methods, the radiological signs are easier to identify in the projection image, thus enabling more efficient examination.

The invention proposes a novel approach to mammography that advantageously makes use of the techniques of digital processing of the radiological image to improve the readability of the information.

These image-processing methods make it possible to cope with the substantial quantity of data by developing new strategies capable of reducing the time taken to review clinical data and of simplifying access to information of clinical interest.

The acquisition techniques of the invention are used to acquire projection images and tomosynthesis sequences with the same machine and preferably with the same compression geometry for a better comparison of the projection images.

The present invention proposes an algorithm for an improved detection of the radiological signs in a standard radiology image. To do so, it comprises means for the detection of the radiological signs in a series of 3D data. The means are used to indicate the position of the clusters in the 3D image by means of markers.

The algorithm of the invention re-projects these 3D markers in the standard projection image. This operation is intended to raise confidence in the radiological signs that would have been detected in the standard projection image. Indeed, this re-projection enables the confirmation, elimination or addition if necessary of the radiological signs in the standard projection image. The invention thus presents an approach that gives an improved detection result. The present invention gives the physician greater confidence in his diagnostic tool.

The algorithm of the invention also gives a 3D image of each radiological sign identified in the standard projection image. Consequently, a reduction of the execution time is achieved since the invention gives only one 3D image for the suspect zones having clinical interest. The number of slices reconstructed for the suspect zones may be much lower than the number of slices reconstructed for an entire breast.

More specifically, an object of the invention is a method of processing an image of an object wherein:

an X-ray tube is shifted on a path relative to the object,
with the tube, for different places along the path of the tube, X-rays are emitted, crossing the object for a multiplicity of directions of emission,
using an X-ray detector situated opposite the emitter relative to the object, pieces of X-ray image data are detected for each of the directions of emission,
at least one standard projection image of the object is produced wherein the presumed suspect zones are represented by markers, from image data wherein the method comprises the following steps:

producing, in a digital volume of markers, 3D markers representing presumed suspect zones of the object,
re-projecting the 3D markers in the standard projection image.

The invention also relates to an X-ray device comprising:

an X-ray tube that emits X-rays going through the object for a multiplicity of directions of emission,
an X-ray detector located so as to be opposite the emitter relative to the object, detecting X-ray projection images,
a first processing unit capable of producing a standard projection image in which presumed suspect zones are represented by markers, wherein the device comprises:

means for the production of a digital volume of 3D markers representing the presumed suspect zones,
means of re-projection of the 3D markers in the standard projection image.

BRIEF DESCRIPTION OF THE DRAWINGS

The invention will be understood more clearly from the following description and the accompanying figures. These figures are given by way of an indication and in no way restrict the scope of the invention.

DETAILED DESCRIPTION OF EMBODIMENTS OF THE INVENTION

Figure 1:
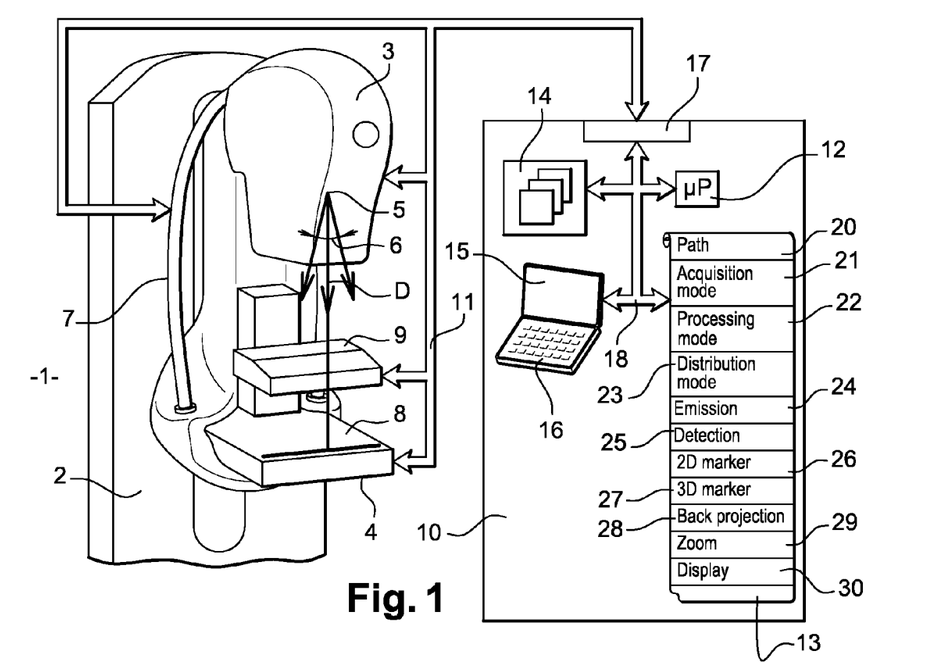
FIG. 1 is a schematic representation of an X-ray device, especially a mammography machine, provided with the improved means of the invention.

FIG. 1 shows an X-ray device, especially a mammography machine, according to the invention. This X-ray device 1 has a vertical column 2. On this vertical column, there is a hinged arm 7 bearing an X-ray-emitting tube 3 and a detector 4 capable of detecting the X-rays emitted by the tube 3. This arm 7 may be oriented vertically, horizontally or obliquely. The tube 3 is provided with a focus 5 which is the X-ray emitting focus. This focus 5 emits an X-ray beam 6 along the direction of emission D.

The arm 7 is hinged on the vertical column 2 in such a way that it enables the tube 3 to be shifted along a path in the shape of an arc of a circle while leaving the detector 4 immobile. Other arrangements are possible by which the tube can be shifted in a plane or in a sphere portion. The tube 3 can then occupy different positions distributed in swiveling between two extreme positions. These two positions are for example symmetrical to each other relative to the perpendicular to the plane of the detector.

In a preferred example, the detector 4 is an electronic detector. In one variant, it may be a radio-sensitive film for the detection of an X-ray image. The detector 4 is hooked to the arm 7 opposite the tube 3 and in the direction of emission D so as to receive the X-ray beam 6.

The arm 7 is provided with a breast-holder tray 8 on which a patient lays her breast. This breast-holder tray 8 is placed on top of the detector 4. The detector 4 is placed beneath the breast-holder tray 8. The detector 4 detects the X-rays that have crossed the patient's breast and the breast-holder tray 8.

Furthermore, for reasons related both to the immobilizing of the breast and to image quality or intensity of X-rays delivered to the patient's breast, it is necessary to compress the patient's breast during the radiography. Various compression forces may be applied. These forces are applied through a compression pad 9 which compresses the breast on the breast-holder tray 8 on the breast-holder tray 8 depending on the type of examination to be made. To this end, the arm 7 has a pad 9 that is a sliding pad capable of being made to compress the breast either manually or in being motor-driven. The pad 9 is made out of an X-ray transparent material, for example plastic. The arm 7 therefore bears the following vertically: starting from the top, the X-ray tube 3, the compression pad 9, the breast-holder tray 8 and the detector 4.

While the pad 9, the patient's breast, the tray 8 and the detector 4 are fixed, the X-ray tube 3 may take up various positions in space relative to this assembly.

In one variant, the detector 4 may be mobile and may take up various positions around the breast at the same time as the X-ray tube 3. In this case, the detector 4 is no longer fixedly joined to the breast-holder tray 8. The detector 4 may be flat or curved. It may be shifted rotationally and/or in translation.

In order to be able to study each part of the patient's breast, the beam 6 may be oriented in a multitude of directions about said breast. After having received the multitude of beams 6 which cross a part of the patient's body, the detector 4 emit electrical signals corresponding to the intensity of the rays received. These electrical signals may then be transmitted to a control logic unit 10 by means of an external bus 11. These electrical signals enable this control logic unit 10 to produce a projection image corresponding to the part of the body analyzed as well as a 3D image of the suspect zones in the projection image. These images can then be displayed by means of a screen of this control logic unit 10 or printed.

The control logic unit 10 is often made in integrated-circuit form. In one example, the control logic unit 10 comprises a microprocessor 12, a program memory 13, a data memory 14, a display screen 15 provided with a keyboard 16 and an output/input interface 17. The microprocessor 12, the program memory 13, the data memory 14, the display screen 15 provided with a keyboard 16 and the input/output interface 17 are interconnected by an internal bus 18.

In practice, when a device is said to have performed an action, this action is performed by a microprocessor of the device controlled by instruction codes recorded in a program memory of the device. The control logic unit 10 is such a device. The control logic unit 10 is often made in integrated-circuit form.

The program memory 13 is divided into several zones, each zone corresponding to instruction codes in order to fulfill a function of the device. Depending on the variants of the invention, the memory 13 comprises a zone 20 comprising instruction codes to set up the different places of the directions of emission along a path of the tube 3 for the right breast and for the left breast. The memory 13 has a zone 21 comprising instruction codes to determine a mode of acquisition of the directions of emission.

The memory 13 has a zone 22 comprising instruction codes to determine an image-processing mode associated with each mode of acquisition of the directions of emission of the zone 21. The memory 13 has a zone 23 comprising instruction codes to implement a mode of distribution of the X-rays on the multiplicity of directions of emission. The memory 13 comprises a zone 24 comprising instruction codes to command the emission of the multiplicity of directions of emission.

The memory 13 comprises a zone 25 comprising instruction codes to acquire the data received by the detector 4. The memory 13 comprises a zone 26 comprising instruction codes to process the data received from the detector, as a function of the determined processing mode, in order to obtain a projection image of the breast, preferably a standard image, comprising markers. These markers are used to identify suspect zones with radiological signs. The memory 13 comprises a zone 27 comprising instruction codes to process the data received from the detector, depending on the determined processing mode, in order to obtain 3D markers of the suspect zones in a digital volume of markers produced.

The memory 13 comprises a zone 28 comprising instruction codes to carry out a re-projection of the 3D markers in the projection image in order to validate, add or eliminate the suspect zones from the projection image if necessary. The memory 13 comprises a zone 29 comprising instruction codes to process the data received from the detector in order to zoom in on the suspect zones present in the projection image of the breast. The memory 13 comprises a zone 30 comprising instruction codes to implement a display of the projection image and/or the 3D image of the suspect zones of the projection image.

In operating mode, the control logic unit 10 determines a path of the tube 3 for the right breast and for the left breast according to a standard projection image chosen by the practitioner. The control logic unit 10 determines the number of X-ray beams 6 to be emitted along the path of the tube 3, as shown in FIGS. 2, 4 and 6.

At present, there are several projection images in mammography which have a standardized terminology. For a screening mammography operation, generally a craniocaudal projection image and a medio-lateral oblique projection image are made on each breast. In certain situations, complementary exposures or examinations may be made, in particular an echography and/or a biopsy.

Figure 2:
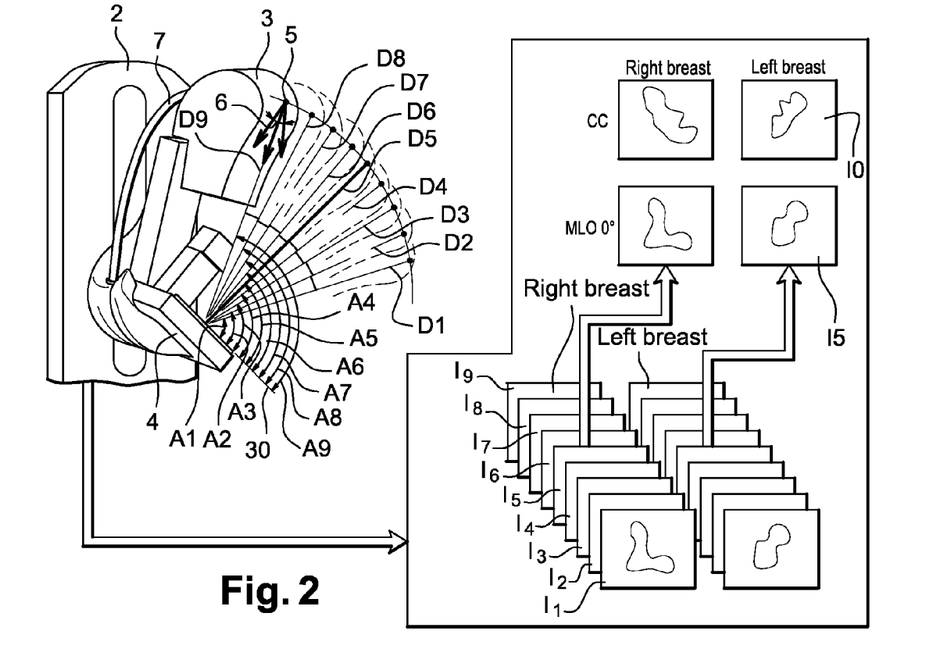
FIG. 2 is a schematic representation of a first mode of acquisition of a series of images for different directions of emission, along one path of the tube for the right breast, according to the invention.
Figure 4:
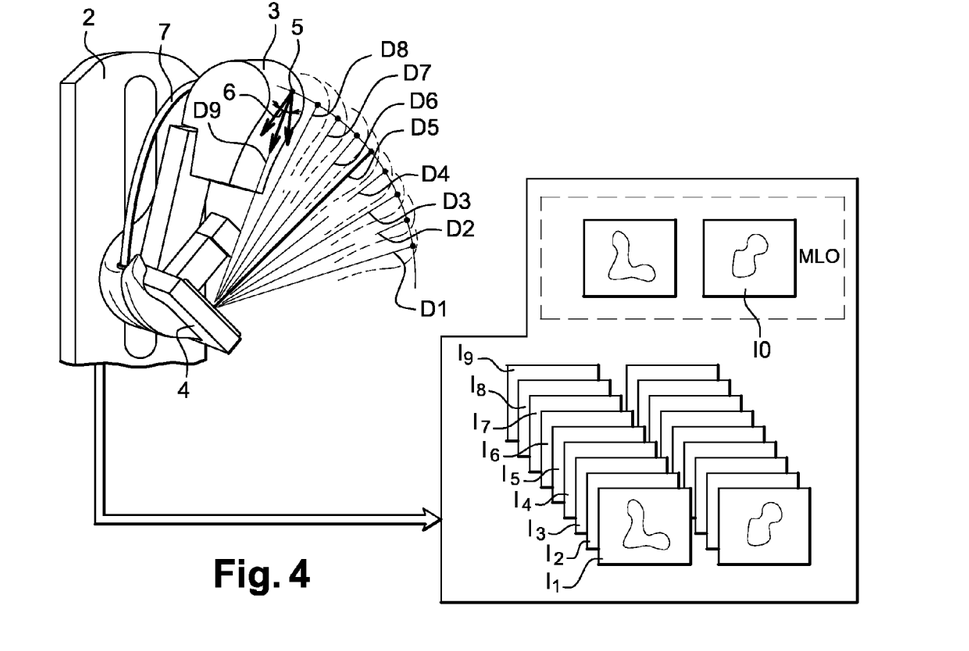
FIG. 4 is a schematic representation of a second mode of acquisition of a series of images for different directions of emission according to a path of the tube for the right breast, according to the invention.
Figure 6:
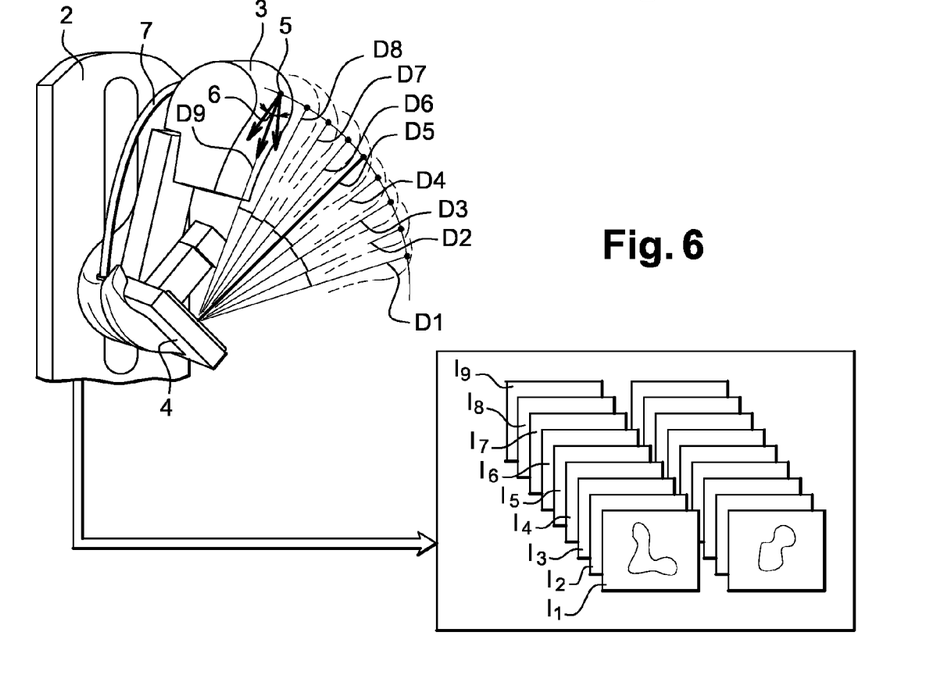
FIG. 6 is a schematic representation of a third mode of acquisition of a series of images for different directions of emission, along a path of the tube for the right breast according to the invention.

FIGS. 2, 4 and 6 show different modes of acquisition of the mammography projection images. On the basis of these three acquisition scenarios, the invention proposes new processing methods to carry out an efficient examination of the suspect zones in the standard projection images. Here below, each of the three acquisition scenarios is associated with an aid system processing and displaying markers. This processing may be replaced by the enhancement of the clinical signs.

Figure 3:
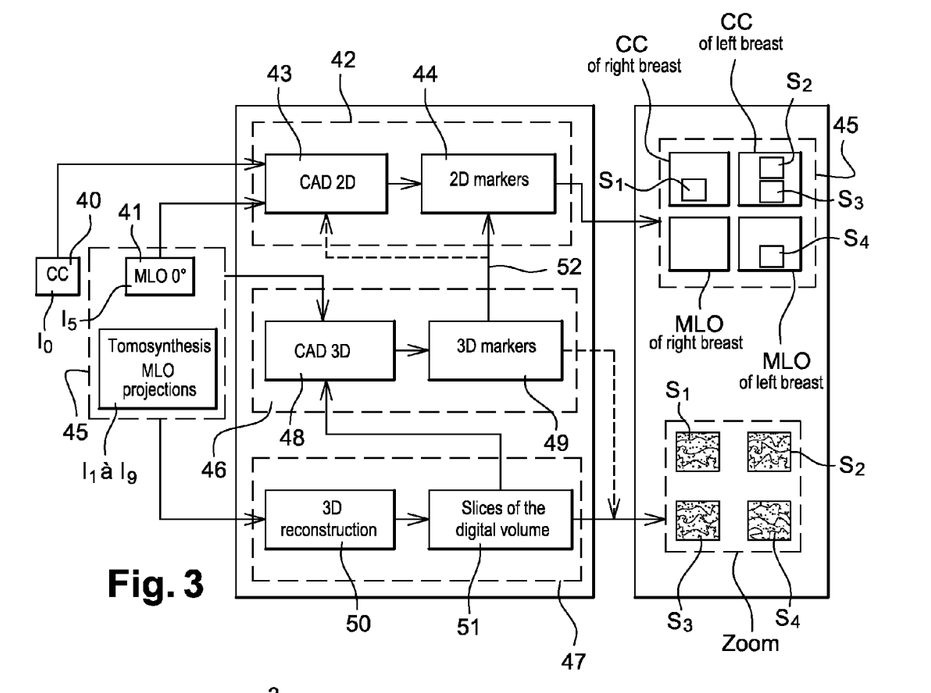
FIG. 3 is a schematic representation of a technique for the digital processing of the series of images acquired along the directions of emission associated with the first mode of acquisition of FIG. 2 according to the invention.
Figure 5:
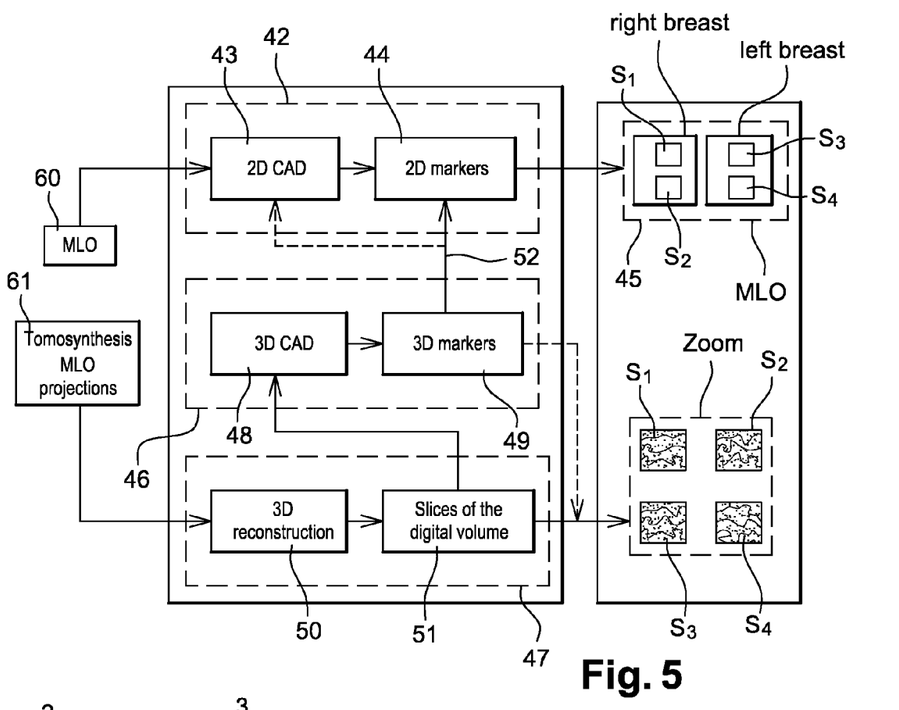
FIG. 5 is a schematic representation of a technique of digital processing of the series of images acquired along the directions of emission associated with the acquisition mode of FIG. 4 according to the invention.
Figure 7:
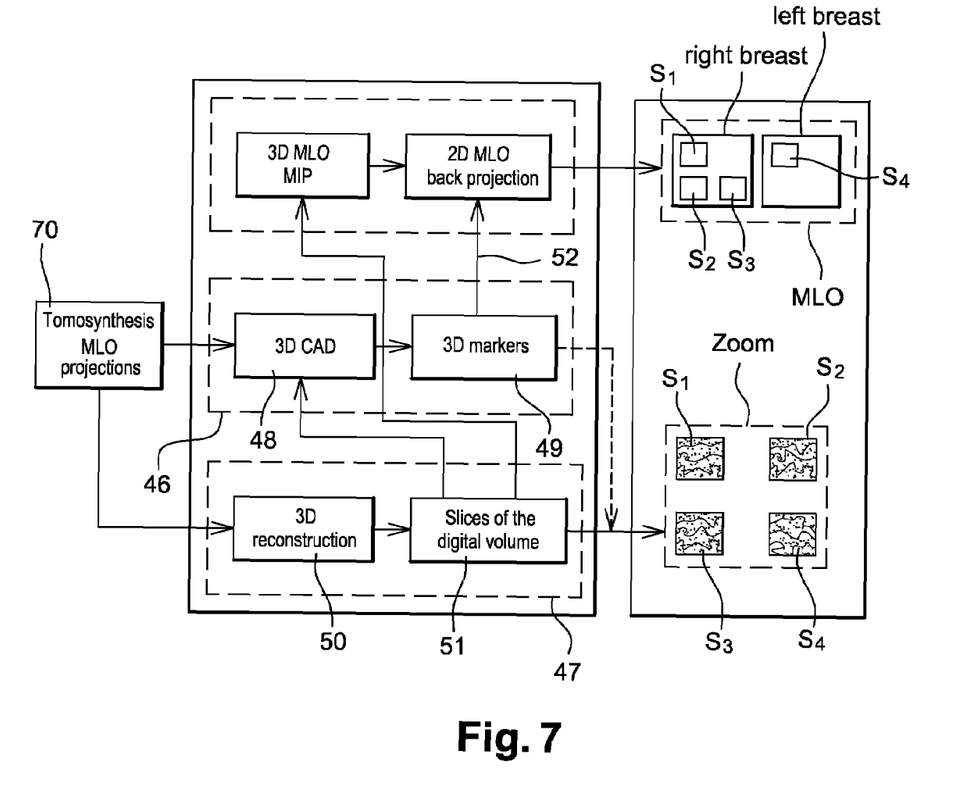
FIG. 7 is a schematic representation of a technique of digital processing of the series of images acquired along the directions of emission associated with the third mode of acquisition of FIG. 6, according to the invention.

FIGS. 3, 5 and 7 respectively show the image-processing modes used for the mammography projection images acquired with FIGS. 2, 4 and 6.

FIG. 2 is a schematic view of a first mode of acquisition of the different directions of emission along a path of the tube for the right breast, according to the invention.

In order to obtain a full representation of the breast relative to a chosen standard projection image, the control logic unit determines a path of the tube for the right breast and a path of the tube for the left breast. The path of the tube for the left breast is opposite the path of the tube for the right breast. In this path of the tube for the left breast, the control logic unit 10 carries out the same operations as in the case of the path of the tube for the right breast. The control logic unit thus produces a standard projection image for each breast.

FIG. 2 shows the tube 3 emitting X-rays that go through the patient's breast for a direction of emission of an medio-lateral oblique projection image and for a multiplicity of directions of emission, along one path of the X-ray tube situated, in the example of FIG. 2, in a plane perpendicular to the detector and parallel to the patient's thoracic cage. The shape of the path of the tube is given by the trajectory of the focus 5. In the example of FIG. 2, the path of the tube has the shape of an arc of a circle.

The control logic unit therefore first of all acquires an image in the direction of craniocaudal emission for each breast. It then acquires a series of images through the multiplicity of beams 6 in order to obtain the multiplicity of directions of medio-lateral oblique emission.

The control logic unit thus acquires two craniocaudal projection images, each representing one breast, a multiplicity of X-ray beams for the tomosynthesis for each breast and two medio-lateral oblique projection images, each representing one breast, extracted from the multiplicity of directions of emission of each breast.

In one variant, the control logic unit can acquire only the multiplicity of directions of emission for the tomosynthesis and extract standard projection images therefrom. In this case, the craniocaudal projection images are no longer acquired.

In another variant, the control logic unit may acquire the data for the tomosynthesis by a series of craniocaudal projections instead of the series of medio-lateral oblique projections, as described in FIG. 2.

To obtain the multiplicity of directions of medio-lateral oblique emission, the control logic unit 10 samples a series of places of the tube 3. A place is a position occupied by the tube on the path. This position is preferably fixed. It may also be mobile. In this case, the position is limited by two boundaries on the path. The breast and therefore the detector are thus irradiated for the duration necessary for the tube to go from one of these positions to the other of these positions, in doing so for each image of the series.

In a preferred example, the focus of the X-ray tube occupies fixed, angularly distributed positions in space. In one example, and although this may not be taken to be a limitation of the invention, it is planned that the angular exploration will thus be equal to 60 degrees, plus or minus 30 degrees relative to a median direction of irradiation, generally perpendicular to the plane of the detector for a mammography apparatus During this exploration, a certain number of beams 6 are acquired, for example 9, 11, 13 or other numbers depending on the desired precision of image reconstruction. It is possible by then applying image reconstruction algorithms of the type used in computerized tomography to reconstruct an image in a slice plane as well as other images in planes adjacent to the plane of this slice. It is thus possible to speak of synthesis tomography in which all the images are acquired in a single scan.

In the example of FIG. 2, the control logic unit 10 determines the number of X-ray beams 6 to be emitted by the focus 5 of the tube 3. In this example, the number of beams is 9. Consequently, the multiplicity of directions of emission is represented by 9 positions numbered D1 to D9. The control logic unit 10 may distribute the places of emission of the tube 3 on the path of the tube. In the example of FIG. 2, the positions of emission of the tube 3 are evenly distributed on the path of the tube.

The control logic unit 10 determines the mode of non-uniform distribution of the totality of the X-rays, commonly called a dose, between the different directions of emission of the trajectories of the tube. This non-uniform distribution provides for a good contrast of the structures of the breast. This dose is preferably equal to the dose making it possible in the prior art to obtain two standard mammography projection images. In the prior art, each of the two projection images receives 50% of the dose.

The control logic unit 10 can thus determine the X-rays to be distributed between the beams 6 as a function of those used in standard mammography. It can also determine them as a function of the thickness of patient's breast.

In the example of FIG. 2, the dose is distributed as a function of the angle A1 to A8 formed respectively by each of the directions of emission D1 to D9 with a normal 30 of the detector 4.

The example of FIG. 2 shows a mode of distribution of the dose on the path of the tube for the right breast. In a preferred embodiment, the control logic unit 10 assigns a greater dose to the direction of emission preferably representing a standard projection image in the path of the tube.

In one variant, the control logic unit 10 may assign a greater dose to the direction of emission that is substantially perpendicular to the plane of the detector 4. It may also assign a greater dose to a direction as a function of the practitioner's prerogatives and the technical constraints of the device. Consequently, any one of the directions of emission may receive the strongest dose. In one example, the control logic unit 10 determines the preferred direction of emission for each path of the tube.

In one example, it assigns 80 percent of the total dose at a rate of 40 percent of the dose to each of the two preferred directions of emission of each path of the tube. It distributes the rest of the dose, which is 20 percent of the dose, preferably in a non-uniform way, to the other remaining directions of emission of each path of the tube.

In the example of FIG. 2, the control logic unit 10 assigns a stronger dose to the direction of emission herein represented by D5. As compared with the other directions which are represented by a thin line, D5 is represented by a bold line to show that it receives a stronger dose relative to the other directions of emission.

In one variant, the control logic unit may assign 40 percent of the dose to the direction D5 and a uniform dose to the other directions.

In one preferred embodiment, the preferred direction of emission is a standard medio-lateral oblique projection image. The craniocaudal projection image is obtained with a standard dose of X-rays. The entire dose used to obtain the multiplicity of beams 6 as well as the craniocaudal projection images is equal or almost equal to the dose usually dispensed in a standard screening examination.

Consequently, with this mode of acquisition, the control logic unit gives two craniocaudal projection images, each representing one breast, two medio-lateral oblique projection images, each representing one breast, extracted from a set of medio-lateral oblique projection images which may be used to reconstruct medio-lateral oblique slices of the breast.

In one variant, the control logic unit may acquire only the multiplicity of X-ray beams for the synthesis tomography with one additional dose of X-rays corresponding to the dose of the craniocaudal projection images which are no longer acquired.

The tube emits X-rays going through the patient's left breast and right breast for one direction of craniocaudal emission and for a multiplicity of directions of emission, along the path of the tube. The detector 4 acquires a piece of standard X-ray image data I0 representing the craniocaudal direction of emission and a multiplicity of pieces of X-ray image data I1 to I9 representing the multiplicity of directions of emission. Each of the pieces of X-ray image data given by the detector represents respectively the direction of emission D1 to D9.

The control logic unit 10 acquires this multiplicity of pieces of X-ray image data I0 to I9 in the data memory 14. It processes these pieces of X-ray image data in order to obtain standard projection images and a 3D image for each suspect zone present in the projection images, as can be seen in FIG. 3.

FIG. 3 shows a schematic view of an example of image processing associated with the mode of acquisition of directions of emission of FIG. 2. The image-data processing mode for each path of each breast is identical. Consequently, this description shall be concerned solely with the mode of processing image data given by the path of the tube for the right breast.

The piece of standard craniocaudal image data I0, numbered 40, obtained in the acquisition mode described in FIG. 2, as well as the piece of preferred medio-lateral oblique image data I5 numbered 41 obtained from the multiplicity of pieces of medio-lateral oblique image data I1 to I9, numbered 45, are processed with an algorithm for the processing of standard projection images. This image-processing algorithm is performed by a first processing unit 42.

This first processing unit 42 produces four projection images 45 corresponding to the four standard images. These projection images 45 are the projection images produced by the current mammography devices. The projection images are shown on the display screen 16 or printed.

This first processing unit 42 comprises a computer-aided detection system 43, more commonly called a CAD system. This computer-aided system 43 is used to read a medical image and analyze it for the extraction therefrom of suspect zones reflecting the presence of a lesion. This computer-aided system 43 gives quantitative information on the lesions.

This computer-aided system 43 can also be used to assist practitioners to take decisions when studying a radiography image that comprises a multitude of data. At output, this computer-aided system 43 gives only the structures that are likely to correspond to radiological signs. To do this, the 2D computer-aided system 43 creates markers 44.

These markers 44 are used by practitioners for the easy detection of the suspect zones in the projection image. The marker 44 is located for example at the X and Y coordinates of the centre of gravity of the suspect zones. It can be represented for example by any graphic annotation defined beforehand or by a blinking feature. Beside the marker 44 there is a legend providing information on the type of lesions of the marked zone. The lesions may be a cluster of microcalcifications or an opacity. This legend may be a graphic annotation different from the graphic annotation of the marker. It may be the same graphic annotation as that of the marker. In this case, the two annotations are differentiated by color.

To eliminate the problem of positive interpretation of these projection images, the control logic unit processes the image data I1 to I9 to collect the maximum amount of information on the marked radiological signs. This information is intended to provide a guarantee to the practitioner that the radiological signs which are marked on the projection image are lesions.

The pieces of X-ray image data I1 to I9 are processed, firstly, by a second processing unit 46 and, secondly, by a third processing unit 47 by tomosynthesis.

The second processing unit 46 comprises a computer-aided detection system 48 working on 3D data. The computer-aided system 48 is used to identify the zones of clinical interest in the reconstructed volume from all the pieces of image data. For each projection image, the computer-aided detection system determines a contour to be assigned to each of the presumed suspect zones. From these contours, it carries out a 3D reconstruction of the projection images. It creates 3D markers in order to facilitate the detection of the suspect zones in the volume, thus obtaining a digital volume of markers.

For each presumed suspect zone, this digital volume of markers comprises a 3D contour. In the digital volume of markers, the marker 49 has the XYZ coordinates of the centre of gravity of the 3D contour. At these XYZ coordinates, there is also a graphic annotation providing information on the type of lesions.

Other algorithms for determining digital volumes of markers may naturally be used instead of this computer-aided system.

To validate the markers present in the projection image, the control logic unit carries out an operation 52 of re-projection of the pixels of the 3D markers 49. This re-projection operation 52 is used to compare and analyze data coming from different projections. This re-projection operation 52 is possible because of knowledge of the acquisition geometry. It makes it possible to confirm or rule out the presence of a marker and/or add a marker in the projection images 45.

The control logic unit verifies whether the presence of the markers of the projection image obtained with the computer-aided system 43 is confirmed or ruled out by the re-projected 3D markers. When a re-projected 3D marker is located at the same coordinates as a marker of the projection image, then the control logic unit confirms that a lesion is truly present in this suspect zone.

When the 3D marker 49 is re-projected in a zone comprising no marker of the projection image, then the control logic unit may consider the zone surrounding this re-projected 3D marker 49 to be a suspect zone. Indeed, the control logic unit deems it to be the case that the 3D computer-aided system 48 receives more data at input and then gives more information on the suspect zones.

When the marker 44 of the projection image is no longer validated by a re-projected 3D marker 49, then the control logic unit may eliminate this marker from the projection image and decide that this zone is not suspect.

The re-projection of the 3D markers in the projection image increases the confidence that the practitioner places in the detected radiological signs. With this type of image processing, the practitioner is assured that the detected zones have a radiological sign reducing, in the same way, the problem of positive interpretation present in currently used projection images.

The device of the invention enables a practitioner to obtain access to a clear image that has high contrast at every point, at a glance and without his needing to adjust the display in any way.

In one variant, the control logic unit may generate markers of the projection image from re-projected 3D markers 49. In this case, there is no longer any step of validation of the markers of the projection image.

When the practitioner wishes to enlarge a suspect zone S1, S2, S3 or S4 of the standard projection images, he or she can use a key of the keyboard 16 or click on one of the markers of the suspect zone S1, S2, S3 or S4 to access a 3D image of said suspect zone surrounding said marker. This automatically activates the display, after a tomosynthesis reconstruction, of the suspect zone alone. Indeed, the fact that the 2D computer-aided system 43 knows the extent of the lesion makes it possible to zoom in solely on the suspect zone. This considerably reduces the time of execution of the image-processing method.

All the pieces of image data I1 to I9 are used during this tomosynthesis reconstruction. These pieces of image data I1 to I9 are sent by the control logic unit to the third processing unit 47. The third processing unit 47 gives a reconstructed raw image of the breast. By a technique of tomosynthesis, this third processing unit, on the basis of a small number of 2D projections of image data distributed in a restricted angular domain and acquired on a digital detector, enables the reconstruction of the raw image of the breast.

The display of a stack of images corresponding to the suspect zone is limited by the extent of the lesion determined by the 2D and/or 3D computer-aided systems. This display may be made by an electronic zooming device for zooming into the slices. This electronic zooming device is a zooming tool applied solely to the part of the image that is clicked upon. It enables precise processing of the part of the image that is of clinical interest. The elements of the image are not modified. Only the proportion displayed on the screen changes. The zooming tool can be used to go forward in the image in order to see the details of the structure of the breast therein.

The display may also be done by other usual tools enabling an improved display of the images, especially the automated command for setting brightness and contrast.

In one variant, the 3D markers may be given by the reconstructed raw image. In this case, the control logic unit segments the raw image. Then, it creates 3D markers to identify the suspect zones of the breast, thus obtaining a digital volume of markers.

FIG. 4 is a schematic view of a second mode of acquisition of the different directions of emission along a path of the tube for the right breast according to the invention.

FIG. 4 shows the tube 3 emitting X-rays that go through the patient's breast for one direction of emission of a medio-lateral oblique projection image and a multiplicity of directions of emission along one path of a medio-lateral oblique projection image.

In the example of FIG. 4, the control logic unit acquires first of all a medio-lateral oblique direction of emission for each breast. Secondly, the control logic unit acquires the multiplicity of beams 6 in order to obtain the multiplicity of medio-lateral oblique directions of emission.

The control logic unit thus acquires two medio-lateral oblique projection images each representing one breast and the multiplicity of directions of emission for the tomosynthesis for each breast.

In one variant, the control logic unit can acquire the multiplicity of directions of emission for the tomosynthesis and extract the standard projection images therefrom.

In another variant, the control logic unit can acquire the data for the tomosynthesis by a series of craniocaudal projections instead of the series of medio-lateral oblique projections as described in FIG. 4.

In another variant, the control logic unit may acquire standard craniocaudal projection images and medio-lateral oblique projection images respectively instead of medio-lateral oblique projection images and craniocaudal projection images respectively while the tomosynthesis acquisition is done for the medio-lateral oblique projection and the craniocaudal projection respectively.

The control logic unit 10 uniformly distributes the totality of the X-rays, commonly called a dose, between the different directions of emission of the two trajectories of the tube. The entire dose used to obtain the multiplicity of beams 6 as well as the medio-lateral oblique projection images is equal or almost equal to the dose usually distributed during a standard screening examination.

The tube emits X-rays going through the patient's breast for a medio-lateral oblique direction of emission and for 9 directions of emission along the path of the tube.

The detector 4 acquires a standard piece of X-ray image data 10 representing the medio-lateral oblique direction of emission and a multiplicity of pieces of X-ray image data I1 to I9 respectively representing the directions of emission D1 to D9.

The logic control unit 10 acquires this multiplicity of pieces of X-ray image data I0 to I9 in the data memory 14. It processes these pieces of X-ray image data in order to obtain standard projection images and a 3D image for each suspect zone present in the projection images, as can be seen in FIG. 5.

FIG. 5 gives a schematic view of an example of image processing associated with the mode of acquisition of the directions of emission of FIG. 4.

The standard piece of medio-lateral oblique image data I0 referenced 60 obtained in FIG. 4 is processed with an algorithm for processing projection images. This image-processing algorithm is performed by the first processing unit 42.

The 2D computer-aided detection system 43 of the processing unit 42 gives the 2D markers 44. These markers 44 enable the practitioners to easily detect suspect zones in the two medio-lateral oblique projection images.

To increase confidence in the radiological signs, the pieces of X-ray image data I1 to I9 are processed firstly by the second processing unit 46 and secondly by the third processing unit 47 by tomosynthesis.

From the set of image data, the 3D computer-aided system 48 enables the identification in the reconstructed volume of the zones showing clinical interest. It creates 3D markers in order to facilitate the detection of the suspect zones.

To validate the markers of the projection image present in the projection image, the 2D computer-aided system 43 performs the operation 52 of re-projection of the 3D markers 49 on the markers of the projection image.

The control logic unit verifies that the markers of the projection image obtained with the 2D computer-aided system 43 are confirmed or ruled out by the re-projected 3D markers, as described in the example of FIG. 3.

All the pieces of image data I1 to I9 are used during the tomosynthesis reconstruction. These pieces of image data I1 to I9 are sent by the control logic unit to the third processing unit 47. The third processing unit 47, using a technique of tomosynthesis, enables the reconstruction solely of the 3D volume of the suspect zone.

The practitioner, by means of a key of the keyboard 16 or by clicking on one of the markers of the suspect zones S1, S2, S3 or S4, automatically activates a tomosynthesis of the suspect zone and accesses the display of the 3D image of said suspect zone surrounding said marker.

FIG. 6 is a schematic view of a third mode of acquisition of the different directions of emission along a path of the tube for the right breast according to the invention.

FIG. 6 shows the tube 3 emitting X-rays that go through the patient's breast for a multiplicity of directions of emission, along a path of a medio-lateral oblique projection image.

In one variant, it is possible to acquire the data for the tomosynthesis by a series of craniocaudal projections instead of the series of medio-lateral oblique projections as described in FIG. 6.

The control logic unit 10 evenly distributes the positions of emission of the tube 3 on the path of the tube. The control logic unit 10 uniformly distributes the totality of the X-rays, commonly called a dose, between the different directions of emission of the two trajectories of the tube. The dose of the tomosynthesis scan is equal to or almost equal to the dose usually distributed during two projection images or a screening examination.

In one variant, the control logic unit distributes the totality of the dose non-uniformly between the different directions of emission of the two trajectories of the tube. In one example, the dose is distributed as a function of the angle A1 to A8 formed respectively by each of the directions of emission D1 to D9 with the normal 30 of the detector 4.

The detector 4 acquires a multiplicity of X-ray image data I1 to I9 respectively representing the directions of emission D1 to D9. The control logic unit 10 acquires this multiplicity of pieces of X-ray image data I0 to I9 in the data memory 14. It processes these pieces of X-ray image data in order to obtain standard projection images and a 3D image for each suspect zone present in the projection images, as can be seen in FIG. 7.

FIG. 7 shows a schematic view of an example of image processing associated with the mode of acquisition of directions of emission of FIG. 2.

The pieces of X-ray image data I1 to I9 are processed firstly by the second processing unit 46 and secondly by the third processing unit 47 by tomosynthesis.

From the set of image data, the 3D computer-aided system 48 enables the identification in the reconstructed volume of the zones showing clinical interest. It creates 3D markers in order to facilitate the detection of the suspect zones. These zones are thus matched with 3D markers 49 in the volume.

The control logic unit produces markers of the projection image from 3D markers 49 in performing the operation 52 of re-projection of the pixels of the 3D markers 49.

The pieces of image data I1 to I9 are sent by the control logic unit to the third processing unit 47. The third processing unit 47 gives the reconstructed raw image of the breast.

In one variant, the control logic unit can obtain the markers of the projection image from reconstructed slices of the reconstructed raw image of the breast. In this case, the set of the data of the reconstructed raw image of the breast is related to a certain number of voxels forming a total volume which may then be processed as a whole and subjected to flat, curved and other slices.

The total volume is projected in order to give the markers of the projection image. The projection is made by an operation on the values of the pixels in a given direction such as for example a sum. In a preferred example, this projection takes account only of the pixels that have a maximum intensity, commonly known as maximum intensity pixels (MIPs).

The practitioner, by means of a key of the keyboard 16 or by clicking on one of the markers of the suspect zones S1, S2, S3 or S4, automatically activates a tomosynthesis of the suspect zone and accesses the display of the 3D image of said suspect zone surrounding said marker.

The invention thus relates to several scenarios of acquisition of standard projection images and tomosynthesis projection images associated with image-processing means enabling efficient examination of the markers of the projection image. With the invention, the radiological results are surer in the standard projection images, the re-projected projection images or the projection images obtained by a mode of projection of the maximum intensity pixels.

The invention also comprises means to view subsets of the reconstructed 3D data corresponding to a marked or enhanced sector.

What is claimed is:

1. A method of processing an image of an object, the method comprising:
   shifting an X-ray tube on a path relative to the object;
   emitting with the X-ray tube, for different places along the path of the tube, X-rays that cross the object in a multiplicity of directions of emission;
   detecting, using an X-ray detector situated opposite the X-ray tube relative to the object, pieces of X-ray image data for each of the directions of emission;
   producing at least one standard projection image of the object from the X-ray image data;
   locating, in the at least one standard projection image, presumed suspect zones which are represented by 2D markers;
   reconstructing the at least one standard projection image to create a digital volume;
   locating, in the digital volume, 3D markers to facilitate the detention of the presumed suspect zones; and
   re-projecting the 3D markers in the at least one standard projection image.

2. A method according to claim 1, wherein the 2D markers of the at least one standard projection image are produced from the 3D markers.

3. A method according to claim 1, wherein reconstructing the at least one standard projection image comprises:
   in the at least one standard projection image, determining a contour to be assigned to each of the presumed suspect zones,
   making a 3D reconstruction of the contours in the at least standard projection image to obtain, in the digital volume, a 3D contour for each presumed suspect zone.

4. A method according to claim 3, wherein the 3D contour is represented by a 3D marker.

5. A method according to claim 1, wherein reconstructing the at least one standard projection image comprises, by the technique of tomosynthesis, enabling the reconstruction of a raw image from the at least one standard projection image,
   making a segmentation of the raw image, and
   locating the 3D markers in the raw image.

6. A method according to claim 1, wherein
   when a 3D marker is re-projected on a 2D marker of the at least one standard projection image, then the presumed suspect zone represented by the 2D marker is considered to have clinical interest,
   else, when the 3D marker is re-projected on a sector of the at least one standard projection image having no 2D marker, then this sector is considered to have clinical interest,
   else, the 2D marker of the at least one standard projection image is considered to have no clinical interest.

7. A method according to claim 1, further comprising:
   displaying a stack of slices of the reconstructed at least one standard projection image demarcated by a contour of the presumed suspect zone.

8. A method according to claim 1 wherein the x-rays are distributed non-uniformly on the multiplicity of directions of emission.

9. A method according to claim 1 wherein the x-rays are distributed uniformly on the multiplicity of directions of emission.

10. A method according to claim 1, further comprising comparing the 2D markers of the at least one standard projection image with re-projected 3D markers.

11. An X-ray device, comprising:
    an X-ray tube operative to emit X-rays going through an object in a multiplicity of directions of emission;
    an X-ray detector located so as to be opposite the X-ray tube relative to the object, and operative to detect X-ray projection images;
    a first processing unit operative to produce, from X-ray image data, at least one standard projection image in which presumed suspect zones are represented by 2D markers;
    means for reconstructing the at least one standard projection image to create a digital volume;
    means for locating, in the digital volume, 3D markers representing the presumed suspect zones,
    a control logic unit configured to re-project the 3D markers in the at least one standard projection image.

12. A device according to claim 11, wherein the means for reconstructing the at least one standard projection image comprises a second processing unit, the second processing unit operative to:
    in the at least one standard projection image, determine a contour to be assigned to each of the presumed suspect zones,
    make a 3D reconstruction of the contours in the at least one standard projection image to obtain, in the digital volume, a 3D marker for each of the presumed suspect zone.

13. A device according to claim 11, wherein the means for reconstructing the at least one standard projection image comprises a third processing unit, the third processing unit operative to:

by the technique of tomosynthesis, enabling the reconstruction of a raw image from the at least one standard projection image,
making a segmentation of the raw image, and
locating the 3D markers in the raw image.

14. A device according to claim 11, wherein the means for distributing the x-rays is used uniformly on the multiplicity of directions of emission.

* * * * *

UNITED STATES PATENT AND TRADEMARK OFFICE
CERTIFICATE OF CORRECTION

| | | |
|---|---|---|
| PATENT NO. | : 7,693,254 B2 | Page 1 of 1 |
| APPLICATION NO. | : 11/673616 | |
| DATED | : April 6, 2010 | |
| INVENTOR(S) | : Muller et al. | |

It is certified that error appears in the above-identified patent and that said Letters Patent is hereby corrected as shown below:

In Column 13, Line 57, in Claim 1, delete "detention" and insert -- detection --, therefor.

Signed and Sealed this
Thirteenth Day of September, 2011

David J. Kappos
*Director of the United States Patent and Trademark Office*